(12) United States Patent
Shi et al.

(10) Patent No.: US 9,077,962 B2
(45) Date of Patent: Jul. 7, 2015

(54) METHOD FOR CALIBRATING VEHICULAR VISION SYSTEM

(71) Applicant: MAGNA INTERNATIONAL INC., Aurora (CA)

(72) Inventors: Bin Shi, Quincy, MA (US); Ghanshyam Rathi, Mississauga (CA); Sharon Zibman, Thornhill (CA); Tom Perovic, Mississauga (CA); Nikhil Gupta, Brampton (CA); Hilda Faraji, Toronto (CA); Yong Zhou, Etobicoke (CA)

(73) Assignee: MAGNA INTERNATIONAL, INC. (CA)

( * ) Notice: Subject to any disclaimer, the term of this patent is extended or adjusted under 35 U.S.C. 154(b) by 13 days.

(21) Appl. No.: 14/076,524

(22) Filed: Nov. 11, 2013

(65) Prior Publication Data

US 2014/0063254 A1 Mar. 6, 2014

Related U.S. Application Data

(63) Continuation of application No. 12/529,832, filed as application No. PCT/CA2008/000477 on Mar. 7, 2008, now Pat. No. 8,581,983.

(60) Provisional application No. 60/893,477, filed on Mar. 7, 2007.

(51) Int. Cl.
*H04N 7/18* (2006.01)
*H04N 17/00* (2006.01)
*G06K 9/00* (2006.01)
*G06K 9/46* (2006.01)
*G06K 9/62* (2006.01)
*B60R 21/015* (2006.01)

(52) U.S. Cl.
CPC .......... *H04N 17/002* (2013.01); *G06K 9/00832* (2013.01); *G06K 9/4642* (2013.01); *G06K 9/6228* (2013.01); *B60R 21/01538* (2014.10)

(58) Field of Classification Search
USPC ........................................................ 348/148
See application file for complete search history.

(56) References Cited

U.S. PATENT DOCUMENTS

| | | | |
|---|---|---|---|
| 5,528,698 | A | 6/1996 | Kamei et al. |
| 5,983,147 | A | 11/1999 | Krumm |
| 6,459,974 | B1 | 10/2002 | Baloch et al. |
| 6,529,809 | B1 | 3/2003 | Breed et al. |
| 6,801,662 | B1 | 10/2004 | Owechko et al. |
| 6,810,133 | B2 * | 10/2004 | Khairallah et al. ........... 382/104 |
| 6,961,443 | B2 | 11/2005 | Mahbub |
| 7,283,901 | B2 | 10/2007 | Luo et al. |
| 7,472,007 | B2 | 12/2008 | Kong et al. |

(Continued)

OTHER PUBLICATIONS

International Search Report and Written Opinion dated Jul. 10, 2008 from PCT Application No. PCT/CA2008/000477.

*Primary Examiner* — Ebrahim Golabbakhsh
(74) *Attorney, Agent, or Firm* — Gardner, Linn, Burkhart & Flory, LLP

(57) ABSTRACT

A method for calibrating a vehicular vision system includes providing a camera at a vehicle, with the camera having a field of view. Images are captured with the camera and a set of resultant images are acquired for a classification. Information is extracted related to image features in the set of resultant images, and an appropriate subset of coefficients is determined. For each classification, a classification vector of at least one appropriate weight is stored that corresponds to the determined subset of coefficients.

20 Claims, 3 Drawing Sheets

(56) References Cited

U.S. PATENT DOCUMENTS

| | | |
|---|---|---|
| 7,505,841 B2 | 3/2009 | Sun et al. |
| 7,526,120 B2 | 4/2009 | Gokturk et al. |
| 7,546,285 B1 * | 6/2009 | Baker, Jr. ............................ 1/1 |
| 8,027,275 B2 * | 9/2011 | Ebata et al. ................... 370/255 |
| 2004/0220705 A1 * | 11/2004 | Basir et al. ........................ 701/1 |
| 2005/0271280 A1 | 12/2005 | Farmer et al. |
| 2006/0088219 A1 * | 4/2006 | Zhang et al. .................. 382/224 |
| 2008/0208677 A1 * | 8/2008 | Mayr et al. ...................... 705/10 |

* cited by examiner

METHOD FOR CALIBRATING VEHICULAR VISION SYSTEM

CROSS REFERENCE TO RELATED APPLICATIONS

The present application is a continuation of U.S. patent application Ser. No. 12/529,832, filed Sep. 3, 2009, now U.S. Pat. No. 8,581,983, which is a 371 national phase application of PCT Application No. PCT/CA2008/000477, filed Mar. 7, 2008, which claims the priority benefit of U.S. provisional application Ser. No. 60/893,477, filed Mar. 7, 2007.

FIELD OF THE INVENTION

The present invention relates to a system and method for determining information relating to the interior of a vehicle and/or its contents. More specifically, the present invention relates to a system and method or determining a classification relating to the interior of the vehicle.

BACKGROUND OF THE INVENTION

Many passenger and other vehicles are now equipped with supplemental restraint systems (SRS), such as front or side airbags, to protect vehicle occupants in the event of an accident. However, while such SRS can in many cases prevent or mitigate the harm which would otherwise occur to a vehicle occupant in an accident situation, in some circumstances it is contemplated that they can exacerbate the injury to a vehicle occupant. Specifically, SRS such as airbags must deploy rapidly, in the event of an accident, and this rapid deployment generates a significant amount of force that can be transferred to the occupant. In particular, children and smaller adults can be injured by the deployment of airbags as they both weigh less than full sized adults and/or they may contact a deploying airbag with different parts of their bodies than would a larger adult.

For these reasons, regulatory agencies have specified the operation and deployment of SRS. More recently, regulatory bodies, such as the National Highway Transportation and Safety Administration (NHTSA) in the United States, have mandated that vehicles be equipped with a device that can automatically inhibit deployment of the passenger airbag in certain circumstances, such as the presence of a child in the passenger seat or the seat being empty.

To date, such devices have been implemented in a variety of manners, the most common being a gel-filled pouch in the seat base with an attached pressure sensor which determines the weight of a person in the passenger seat and, based upon that measured weight, either inhibits or permits the deployment of the airbag. However, such systems are subject to several problems including the inability to distinguish between an object placed on the seat and people on the seat, the presence of child booster/restraint seats, etc.

It has been proposed that image-based sensor systems could solve many of the problems of identifying and/or classifying occupants of a vehicle to control SRS but, to date, no such system has been developed which can reliably make such determinations in real world circumstances wherein lighting conditions, the range of object variability, materials and surface coverings and environmental factors can seriously impede the ability of the previously proposed image-based systems from making a reliable classification.

It has also previously been proposed that image-based systems and methods may be useful in classifying matters such as a measure of driver alertness, by acquiring and processing images of the driver within the interior of the vehicle, or classifying the presence of passengers within the vehicle allowing for the optimized control of vehicle environmental systems (such as air conditioning) and/or entertainment systems by classifying the occupancy of one or more vehicle seats. However, to date, it has proven difficult to achieve a desired level of reliability for such systems.

It is desired to have an image-based system and method that can determine a classification relating to the interior of the vehicle, such as the occupancy status of a vehicle seat, from one or more images of the vehicle interior.

SUMMARY OF THE INVENTION

It is an object of the present invention to provide a novel system and method of determining a classification relating to the interior of the vehicle which obviates or mitigates at least one disadvantage of the prior art.

According to a first aspect of the present invention, there is provided a method for determining a classification relating to the interior of a vehicle, comprising the steps of: (i) with an image capture device, acquiring a resultant image of a portion of the vehicle interior which is of interest; (ii) extracting information relating to a set of image features from the acquired resultant image; (iii) statistically processing the extracted information with a previously determined set of image feature information values, each member of the set of image feature information values corresponding to a respective one of a set of predefined classifications relating to the interior of the vehicle, to determine the most probable classification; and (iv) outputting the determined most probable classification related to the interior of the vehicle.

Preferably, step (ii) comprises processing the resultant image with a two dimensional complex discrete wavelet transform to produce a selected set of coefficients related to features in the acquired resultant image and, in step (iii), the previously determined set of image feature values comprises a set of weights for each defined classification, the weights being multiplied with the set of coefficients to produce a score for each defined classification, the defined classification with the highest produced score being the classification output in step (iv).

Also preferably, the determined classification relates to the occupancy of a vehicle seat and the portion of the vehicle interior which is of interest includes the portion of the vehicle seat which would be occupied by a passenger in the vehicle.

According to another aspect of the present invention, there is provided a system for determining a classification relating to the interior of a vehicle, comprising: an image capture device operable to acquire an image of a portion of the vehicle interior which is of interest; an image capture subsystem operable to process the image to limit the dynamic range of the image to obtain a resultant image; an image feature extractor operable to produce for the resultant image a set of values corresponding to features in the resultant image; and a classifier operable to combine the set of values produced by the image feature extractor with a predetermined set of classification values, each classification value corresponding to a different possible predefined classification, the results of this combination representing the probability that each predefined classification is the current classification, the classifier operable to select and output the most probable classification.

The present invention also provides a vehicle interior classification system and method which determines a classification relating to the interior of the vehicle, such as the occupancy status of a vehicle seat or the state of alertness of a vehicle driver, from one or more images of an appropriate portion of the interior of the vehicle acquired with an image capture device.

The acquired images are preferably processed to limit the dynamic range of the images to obtain a resultant image which can comprise one or more regions of interest which are less than the total field of view of the image capture device.

The resultant images are processed to extract information about features in the image and, in one embodiment, this processing is achieved with a two-dimensional complex discrete wavelet transform which produces a set of coefficients corresponding to the presence and/or location of the features in the resultant image.

The set of coefficients produced with such a transform is potentially quite large and can be reduced, through described techniques, to a subset of the total number of coefficients, the members of the subset being selected for their ability to discriminate between the classifications defined for the system.

By selecting a subset of the possible coefficients, computational requirements are reduced, as are hardware requirements in the system, such as memory.

The selected set of coefficients (whether comprising all of the coefficients or a subset thereof) are provided to a classifier which processes the coefficients with a set of calibration vectors, that were determined when the system was calibrated, to determine the most probable classification for the portion of the vehicle interior.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
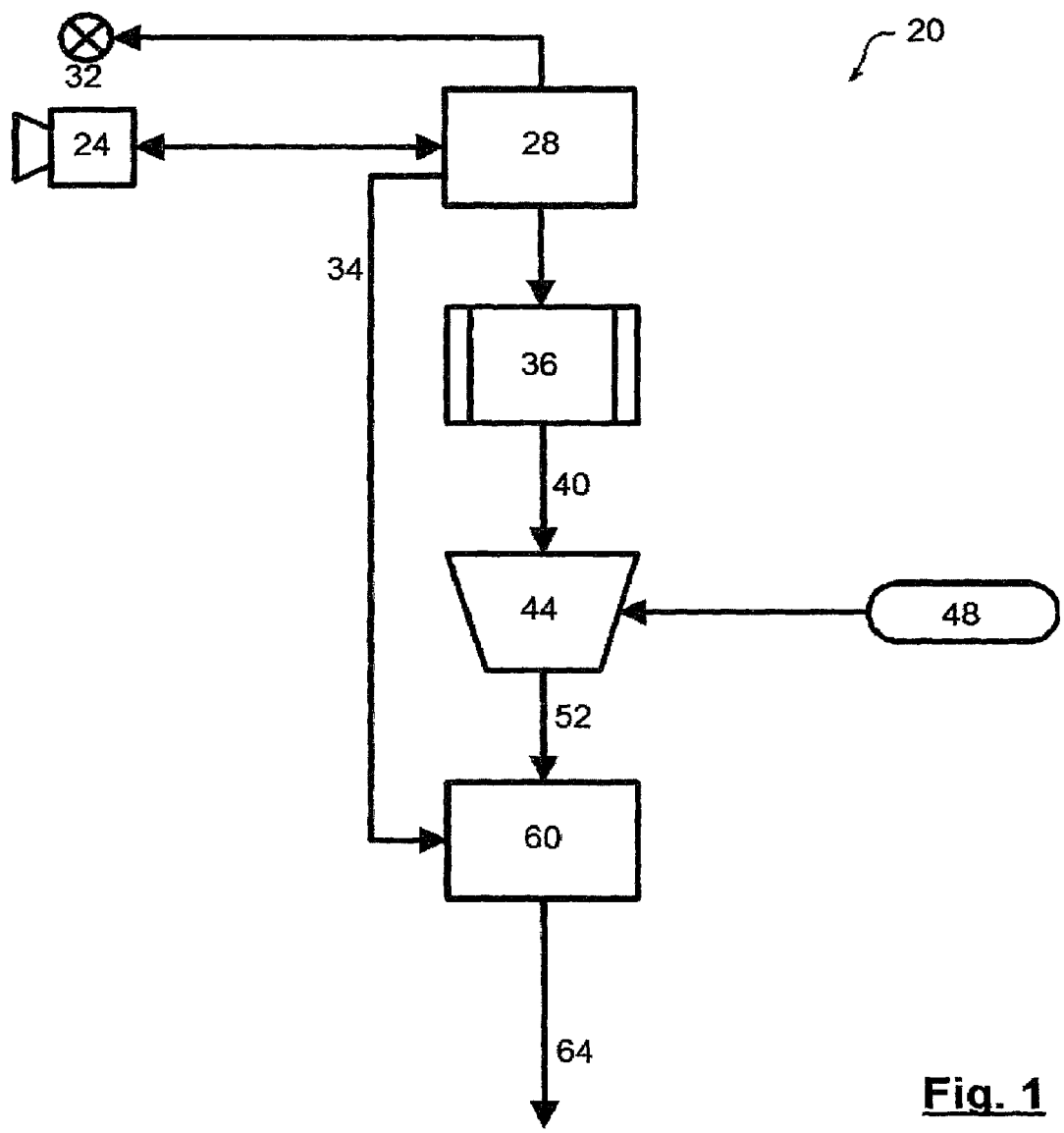
FIG. 1 is a block diagram representation of a classification system in accordance with the present invention.

A vehicle interior classification system in accordance with the present invention is indicated generally at 20 in FIG. 1. System 20 includes an image capture device 24 which can be any suitable device or system for capturing an image, or sequence of images, of the portion of interest of the interior of the vehicle in which system 20 is installed. In the following discussion, a specific implementation of the present invention is described, wherein a determination of the occupancy status of a vehicle seat is obtained.

However, as will be apparent to those of skill in the art, the present invention is not so limited and can be employed to determine a wide range of classifications, based upon images of at least portions of the interior of a vehicle. For example, a classification of driver alertness can be determined with other embodiments of the present invention by capturing images of the driver seat occupant and surrounding area.

Examples of suitable image capture devices 24 include CMOS and/or CCD camera systems with at least one image sensor and an appropriate set of optical lenses and/or filters so that a suitable image of a portion of interest in the interior of the vehicle can be obtained. In a present embodiment of the invention, image capture device 24 acquires grayscale images but it is contemplated that color images can also be employed in some circumstances if desired. In the present embodiment, image capture device is a CMOS monochrome MT9V022 system, manufactured by Micron Technology, Inc., 8000 S. Federal Way, Boise, Id., USA and this system produces an image with a resolution of one-hundred and eighty-eight pixels by one-hundred and twenty pixels.

It is also contemplated that image capture device 24 can be a time of flight (ToF) imaging device. Such devices are known and use the difference in the polarization of the source light and the reflected light from imaged objects to determine image depth information. It is contemplated that, if desired, image capture device 24 can acquire images using ToF techniques or, more preferably, that image capture device 24 can acquire both a ToF-derived image and a conventionally acquired image. In such a case, the image (or a portion of it) acquired by ToF can be employed in addition to the image acquired with the conventional imaging techniques.

Image capture device 24 is located in the vehicle interior at a position whereby the portion of the interior which is of interest can be imaged. For the specific example of determining a classification the occupant a seat, the occupant seating portion of the vehicle seat under consideration will be imaged. In many circumstances, it will be desired to classify the occupancy of the front passenger seat, but it is also contemplated that it may be desired to classify the occupancy of rear seats of a vehicle to control side air bag SRS or other systems.

To date, in order to capture images of the occupant seating portion of passenger seats, the present inventors have successfully located image capture device 24 in the roof liner, the A pillar and/or in the overhead console of different vehicles. However, as will be apparent to those of skill in the art, the present invention is not limited to image capture device 24 being located in any of the these three positions and, instead, image capture device 24 can be located in any suitable position as will occur to those of skill in the art provided that the selected position allows for the acquisition of images of the portion of interest in the vehicle interior. For example, for classifying driver alertness, image capture device 24 can be located in the A pillar adjacent the driver, the roof liner or the dashboard instrument cluster, etc. One of the challenges of using image-based technologies in a vehicle is the wide range of lighting conditions that the system must cope with.

Lighting conditions ranging from direct sunlight, to overcast sunlight to nighttime conditions must all be accommodated by image capture device 24. Further, the dynamic range of the captured images can be very large as part of the image may be in direct sunlight while another part may be in shade. To deal with images with a high dynamic range, many available CCD and/or CMOS camera systems provide high dynamic range (HDR) functions which process captured images by taking multiple images at different imaging sensitivities and combing appropriate portions of these images to acquire a single resultant image CIResultant) with a reduced dynamic range. Imaging devices and/or systems with such HDR functions are well known and are commercially available, and CCD or CMOS camera systems with HDR functions can be employed as image capture device 24 in the present invention. In such a case, the HDR processed !Resultant image is employed by system 20, as described further below.

However, in a presently preferred embodiment of the invention, system 20 does not employ an HDR function but instead employs an image subtraction process to acquire acceptable resultant images with image capture device 24. Specifically, image capture device 24 is connected to an image capture subsystem 28 as is an auxiliary light source 32. Auxiliary light source 32 comprises one or more sources of Near Infrared (NIR) light (i.e.—light wavelengths in the range from about 700 nanometers to about 1500 nanometers), such as NIR emitting LEDs.

Auxiliary light source 32 is positioned within the vehicle such that the emitted light will illuminate the region of interest of the vehicle interior. Subsystem 28 controls auxiliary light source 32 and can activate or deactivate auxiliary light source 32 as needed. Image capture device 24 includes a filter system which allows image capture device 24 to capture images using visible light and the NIR light emitted by auxiliary light source 32, while preferably blocking other undesired light such as far infrared light and/or UV light which may otherwise degrade the acquired images. To capture an image for use in system 20 in the presently preferred embodiment of the invention, image capture subsystem 28 activates image capture device 24 to acquire one image (!Ambient) of the region of interest of the vehicle interior illuminated with the ambient light in the vehicle. The captured Ambient image is stored in a memory in image capture subsystem 28.

Next, image capture subsystem 28 activates auxiliary light source 32 to illuminate the occupant seating portion of the vehicle seat with NIR light, in addition to the ambient light, and activates image capture device 24 to acquire a second image 0Ambient+N1R) of the region of interest of the vehicle interior.

The first, IAmbient image is then subtracted from the second, IAmbient+NIR image by image capture subsystem 28. Provided that !Ambient and IAmbient+NIR were acquired with little time passage between the image capture operations, large changes in the ambient light conditions between capture of IAmbient and IAmbient+NIR are avoided and this results in an image which is effectively an image acquired with NIR light only (IN1R) and which can be employed as the resultant image IResultant in system 20.

!Resultant=*INIR*=*I*Ambient+*NIR*−!Ambient

In a present embodiment, image capture and processing speeds of five or more resultant images per second have been easily achieved. Thus the influences and effects of ambient lighting within the vehicle are mitigated and images with large dynamic ranges are avoided.

The use of NIR light in auxiliary light source 32 is presently preferred as: NIR light is invisible to the human eye, thus having no effect on the passengers of the vehicle and ambient sunlight tends to have relatively little light in the NIR wavelengths as these wavelengths are readily absorbed by moisture in the atmosphere. However, as will be apparent to those of skill in the art, the present invention is not limited to the use of light in NIR wavelengths for auxiliary light source 32 and other light frequencies can be employed for image subtraction operations in the present invention, if desired. Further, while the use of image subtraction is presently preferred over HOR processing of images, the present invention is not limited to the use of image subtraction processing to acquire resultant images and HOR processing or any other suitable manner of obtaining useful resultant images can be employed as will occur to those of skill in the art.

In addition to controlling image capture device 24, auxiliary light source 32 and performing either HOR functions or image subtraction operations to obtain !Resultant image capture subsystem 28 preferably also performs an Occlusion Detection function. Specifically, as system 20 requires an image of the region of interest of the interior of the vehicle, any significant occlusion of the field of view of image capture device 24 can inhibit proper operation of system 20.

Such significant occlusions can occur, for example, when an occupant of the vehicle places a hand, arm or other body portion in a position which may occlude a substantial portion of the field of view of image capture device 24, or when cargo or luggage is similarly placed, etc.

Accordingly, image capture subsystem 28 preferably includes an Occlusion Detection function to detect unacceptable occlusions in the field of view of image capture device 24. The Occlusion Detection function can be implemented in a variety of manners, as will occur to those of skill in the art, and is not be discussed herein in further detail.

In the event that the Occlusion Detection function detects an unacceptable occlusion in the field of view of image capture device 24, system 20 can provide an alarm or other signal to the vehicle occupants to indicate the unacceptable occlusion and/or can provide a control signal 34 such that system 20 will output a predefined default safe classification to other appropriate vehicle systems, such as SRS.

Once image capture subsystem 28 has a suitable resultant image, that resultant image is provided to an image feature extractor 36. Image feature extractor 36 operates on the acquired resultant image to produce information relating to the occurrence, amplitudes, locations and/or other information relating to features and/or aspects of the resultant image. In a presently preferred embodiment of the invention, image feature extractor 36 performs a two dimensional Discrete Wavelet Transform (DWT) on the resultant image to produce a set of coefficient values relating to the features within the resultant image. More specifically, in this embodiment, image feature extractor 36 employs a two dimensional Complex Discrete Wavelet Transform (CDWT) to produce the desired set of coefficient values. DWT's and CDWT's are well known to those of skill in the art and CDWT's are discussed, for example, in "Image Processing With Complex Wavelets", Phil. Trans. R. Soc. Land. A, 357, 2543-2560, September 1999, by Nick G. Kingsbury, the contents of which are incorporated herein by reference.

In a present embodiment, the resultant image is decomposed by image feature extractor 36 using Daubechies filters with the two dimensional CDWT.

However, it will be understood that any other suitable wavelet filter can be employed, as will occur to those of skill in the art, such as Haar filters for example. In a present embodiment, the resultant image is processed to three levels with the two dimensional CDWT as it has been found that three levels of feature extraction provide a reasonable and useful set of information about features in the resultant image. However, the present invention is not limited to three levels of decomposition of the resultant image and it is contemplated that even one level of decomposition can provide worthwhile results in some circumstances. However, generally, two or more levels of processing are preferred.

As will be apparent to those of skill in the art, the processing of the acquired resultant image with a two dimensional CDWT produces a large set of coefficients. In the above-mentioned example of image capture device 24 having a resolution of one-hundred and eighty-eight by one-hundred and twenty pixels, for a total of twenty-two thousand, five-hundred and six pixels, a first level of decomposition of the acquired resultant image with a two dimensional CDWT results in four coefficients for each pixel, or ninety-thousand, two-hundred and forty coefficients. A second level of decomposition results in another twenty-two thousand, five-hundred and sixty coefficients. A third level of decomposition results in yet another five-thousand, six-hundred and forty coefficients.

Thus, for the example wherein image capture device has a resolution of one-hundred and eighty-eight by one-hundred and twenty pixels, three levels of decomposition of the resultant image with the two dimensional CDWT results in a total of one-hundred and eighteen thousand, four-hundred and forty coefficients.

As should be apparent, in many circumstances it is desirable to reduce this number of coefficients to a more reasonable number, to reduce subsequent computational requirements and hardware expenses and to obtain a more manageable system. Accordingly, as is described below in more detail, a representative subset of these coefficients is preferably selected as elements in a one dimensional array, referred to herein as the feature vector 40, which represents a selection of the information relating to features of interest in the resultant image.

While the present invention can operate on the entire resultant image, the present inventors have determined that advantages can be obtained when the resultant image from image capture subsystem 28 is subdivided into one or more regions of interest (ROI) and image feature extractor 36 only operates on these ROIs. Thus while a ROI can be the entire field of view of image capture device 24, it is preferred that one or more smaller ROIs be defined. The advantages of employing ROIs representing less than the entire field of view of image capture device 24 include reduced computational complexity, as only the portions of the resultant image which can contribute to a meaningful result are processed by image feature extractor 36, and portions of the field of view of image capture device 24 which could contain "distractions" (such as, for example, reflections in a side window) that could lead to incorrect results, are not processed by image feature extractor 36.

For example, if system 20 is determining a classification of the occupancy of the front passenger seat in a vehicle, one or more ROIs can be defined which otherwise exclude those portions of the rear vehicle seat and surrounding area and/or portions of the side window area that are included in the total field of view of image capture device 24.

Accordingly, as part of the setup and calibration of systems 20 (described below in more detail) a set of one or more ROIs is defined for the portion of the vehicle interior which is of interest.

When ROIs are employed, these ROI definitions are used by image capture subsystem 28 to extract and process only the portions of the captured images within the defined ROIs to produce a resultant image containing only the ROIs. This resultant image is then provided to image feature extractor 36 which produces a correspondingly reduced number of coefficients compared to processing the entire field of view (i.e.—full resolution) of image capture device 24.

For example, in a particular implementation of the present invention for determining a classification of the occupant of a seat, the resultant image is subdivided into three ROIs which comprise about sixty percent of the total pixels of the entire field of view of image capture device 24. If the defined three ROIs have a total resolution of about thirteen-thousand, five-hundred and thirty-six pixels (i.e.—about sixty percent of twenty-two thousand, five-hundred and sixty pixels), and the ROIs are decomposed to three levels with a two dimensional CDWT, this results in about sixty-eight thousand and forty coefficients, rather than the one-hundred and eighteen thousand, four-hundred and forty coefficients which would result from processing the entire field of view.

Each set of these coefficients, or each of a selected subset of them (as described in more detail below with respect to the setup and calibration of system 20) comprise the elements of a feature vector 40 which represents the image features of interest to system 20. In a present embodiment of the invention, image feature extractor 36 is implemented with a Blackfin™ digital signal processor (DSP), manufactured by Analog Devices, Inc., Three Technology Way, Norwood, Mass., USA, although any suitable DSP or other suitable computing device can be employed, as will occur to those of skill in the art.

Each feature vector 40 from image feature extractor 36 is provided to a classifier 44 which processes feature vector 40 with a predefined library 48 of calibration vectors, whose elements comprise weights. Each calibration vector in library 48 corresponds to one of a set of classifications predefined for system 20 and library 48 is produced during the setup and calibration of system 20, as described below.

For example, when system 20 is used to classify the occupancy of a vehicle seat to control a SRS, a set of possible classifications can include "adult", "child", "empty seat", "object", "child restraint seat", etc. For driver alertness monitoring systems, possible classifications can include "alert", "impaired", "attention wandering", etc.

Classifier 44 combines feature vector 40 with the classification vectors in library 48, as described below, to obtain a most likely classification 52 for the region of interest of the interior of the vehicle imaged by system 20.

Classification 52 is then provided to a decision processor 60, described in more detail below, which determines an operating classification for that region of interest and outputs a control signal 64, appropriate for the determined operating classification, to other vehicle systems.

In the above-mentioned occupancy-based SRS control example, the operating classification relates to the classification of the occupant of the vehicle seat imaged (or other vehicle interior region being classified) by system 20 where, for example, if the operating classification corresponds to "child", signal 64 may be used to inhibit deployment of the SRS.

As is apparent from the above, the setup and calibration of system 20 is important for the correct operation of system 20 and will now be described. As a first step in the setup and calibration of system 20, a set of ROIs are defined for the images captured by image capture device 24. As mentioned above, the ROI can comprise the entire field of view of image capture device 24, but it is preferred that the field of view of image capture device 24 instead be divided into two or more ROIs which exclude at least part of the field of view of image capture device 24 to reduce processing requirements, reduce hardware expense and, where possible, to remove possible sources of "distractions" from the resultant images.

Generally, the ROIs are determined empirically, but in a more or less common-sense manner. For example, if the occupancy status of a vehicle front passenger seat is to be determined, the region of the captured image in which the top of the seat base (on which a passenger rests) and the front of the seat back (against which a seat occupant's back touches) are visible, throughout the total permitted range of movement of the seat base and seat back, can be defined as one, or two, ROIs. Similarly, the area adjacent the vertical side of the seat back, throughout its entire permitted range of movement, can be defined as another ROI.

As will be apparent to those of skill in the art, the present invention is not limited to the resultant images comprising one, or two, ROIs and three or more ROIs can be defined as desired.

Once a presumed reasonable set of ROIs has been defined for setup and calibration, effectively defining the resultant image which will be processed, system 20 is operated through a plurality of calibration scenarios, as described below, each of which scenarios corresponds to a known one of the classifications to be defined for system 20.

For example, assuming one of the classifications defined for system 20 is "adult", an adult (or an anthropomorphic training dummy (ATD) representing an adult), is placed in the vehicle seat. A resultant image, comprising the defined ROIs, is obtained of the seat's occupant by image capture device 24 and image capture subsystem 28 and is processed by image feature extractor 36. Image feature extractor 36 produces a feature vector 40 comprising the set of coefficients decomposed from the resultant image and that feature vector is associated with the appropriate classification, in this case "adult".

The process is repeated a number of times for the classification being calibrated (i.e.—"adult"} with changes being made to the scenario each time.

These changes can include changing the adult (or ATD's) position in the seat and/or the seat position, changing the adult (or ATD) for another adult-sized person (or ATD) with different dimensions, etc. until a representative set of feature vectors has been obtained for the "adult" classification. This may require that one thousand or more calibration images be acquired and processed.

The process is then repeated with scenarios appropriate for each other classification (e.g.—"empty seat", "object on seat", "alert drive", etc.) to be defined for system 20 to produce an appropriate set of feature vectors for each classification to be defined and calibrated.

As mentioned above, even with the definition of appropriate ROIs and operating image feature extractor 36 only on pixels within those ROIs, the number of coefficients which results is still very large. To further reduce the number of coefficients and to produce the classification weights for the classification vectors of library 48, the calibration process then employs a statistical regression model to iteratively identify the indices of a subset of the total number of coefficients in each vector resulting from processing the ROIs, where the coefficients in this subset are sufficient to effectively discriminate between the defined classifications.

For example, in the example given above, each feature vector comprises sixty-eight thousand and forty coefficients (i.e.—{c1•..., Ces,040}).

The result of the statistical regression process can be the identification of a subset of two-thousand, two-hundred of those coefficients, (e.g.—{c213, C503, C2425, ..., Csg.oos}), and the production of a set of corresponding regression weights, which can effectively discriminate between the defined classifications.

In a present embodiment of the invention, the selection of the subset of coefficients and production of the regression weights is performed on the feature vectors obtained from the classification scenarios using an iterative wrapper method, with a "best-first" feature search engine, and a partial least squares regression model as the induction algorithm.

Suitable wrapper methods are well known and one description of an iterative wrapper method is provided in, "The Wrapper Approach" by Ron Kohavi and George H. John, a chapter in, "Feature Extraction, Construction and Selection: A Data Mining Perspective", edited by Huan Liu and Hiroshi Motoda and published by Kluwer Academic Press, 1998. Another description is provided in "Wrappers For Feature Subset Selection (late draft)", by Ron Kohavi and George H. John, from "Artificial Intelligence Journal, special issue on Relevance", Vol. 97, Nos. 1-2, pp. 273-324.

The statistical regression model employs a partial least squares dimension reduction technique, combined with multinomial logistic regression to produce appropriate regression weights for the coefficients at each selected coefficient index.

As mentioned above, this process is iterative, with different subsets of coefficients being considered for their ability to discriminate between defined classifications. If the subset of coefficients identified by this process proves to be less accurate than desired at discriminating between two or more classifications under some conditions, the definition of the ROIs can also be changed. In this case, the calibration scenarios can be re-executed and/or additional calibration scenarios can be added, the production of feature vectors is performed again and the statistical regression process is performed again, iteratively, until a satisfactory definition of the ROIs and a satisfactory subset of coefficients, and their corresponding regression weights, is obtained.

For each defined classification of system 20, a calibration vector of the calculated regression weights, corresponding to the indices of the selected subset of coefficients, is stored in library 48 to represent each defined classification of system 20. Thus, if system 20 has six defined classifications, library 48 will include six calibration vectors, each corresponding to one of the defined classifications. Calibration and setup of system 20 is then complete.

Typically, calibration and setup of system 20 must be performed once for each model of vehicle that system 20 is to be installed in due to the specific geometries of the interior of the vehicles, the design of the seats employed, etc. Subsequent changes in seat design or other interior factors of a model can require recalibration of system 20.

It is contemplated that library 48 can be updated from time to time and reloaded into a vehicle employing system 20, if needed, to allow system 20 to handle new classifications, to correct commonly occurring misclassifications that have been identified subsequent to calibration and setup, etc.

Once calibration and setup have been completed, image feature extractor 36 will only determine values for the subset of coefficients selected during calibration. Thus, in the example above, image feature extractor 36 will determine values for the about two thousand, two hundred coefficients in the selected subset and each calibration vector in library 48 includes a like number of regression weights.

As mentioned above, in normal operations (i.e.—once calibration and setup have been completed) image feature extractor 36 outputs to classifier 44 a feature vector 40 which comprises the determined values for each of the identified subset of coefficients decomposed from a resultant image.

Classifier 44 receives feature vector 40 and multiplies a copy of feature vector 40 with each of the calibration vectors in library 48 to produce a corresponding set of scores, one score per defined classification. Each score indicates the likelihood that the region of interest in the vehicle under consideration by system 20 is in a respective one of the defined classifications. The classification which has highest determined score is then output, to a decision processor 60, as classification 52.

Decision processor 60 preferably employs a classification (i.e.—state) transition model and a temporal model to filter classifications 52 received from classifier 44 to reduce the probability of intermittent misclassifications.

In particular, transient artifacts in the resultant image and/or positioning of people and/or objects within the region of interest in the vehicle under consideration can result in brief errors in the classification.

Accordingly, decision processor 60 employs classification 52, a history and a state change table to determine an appropriate output classification 64 from system 20.

Specifically, the state change table is a heuristic table that contains values which define the probability of transition from each defined state (i.e. defined classification) of system 20 to each other defined state. For example, for seat occupancy classifications, the change from an "adult" classification to an "empty seat" classification is more likely than a direct transition from an "adult" classification to a "child" classification. Accordingly, the state change table contains a set of state change probability values (SCPs) that define the probability of each state changing to each other state.

Decision processor 60 maintains a numeric confidence level (CL) which defines the stability/confidence of the current output classification 64.

When system 20 starts, or when decision processor 60 changes output classification 64, CL is set to a value of one, which indicates that the current output classification is relatively new, with little prior history. Decision processor 60 increments or decrements CL based upon the values of two counters maintained in decision processor 60. Specifically, decision processor 60 maintains a confidence level up (CLU) counter and a confidence level down (CLO) counter, each of which has a predefined minimum value of zero and a predefined maximum value.

When classification 52 from classifier 44 is the same classification as the current output classification 64, the CLU counter is incremented and the CLO counter is reset to zero by decision processor 60. Conversely, when classification 52 from classifier 44 is a different classification than the current output classification 64, the CLO counter is incremented and the CLU counter is reset to zero by decision processor 60.

A confidence level test (CLT) value is predefined against which the CLO and CLU counters are compared. If the CLU counter equals the CLT value, then CL is incremented and the CLU counter is reset to zero. Conversely, if the CLO counter equals the CLT, then CL is decremented and the CLO is reset to zero. If neither the CLO or CLU values are equal to the CLT, the CL remains unchanged. Essentially, the CLT defines the number of output classifications 52 required to occur before a change in the output classification 64 can occur.

Finally, a state change value (SCV) is used to effect changes in the output classification 64. Specifically, the SCV is the product of the CL and the corresponding SCP in the state change table. For example, if the current output classification 64 is "adult" and the most recent classification 52 received at decision processor 60 is "empty seat", then the SCP in the state control table corresponding to a state change from "adult" to "empty seat" is multiplied with the current CL to obtain a SCV.

If the most recent classification 52 has been received, unchanged, at decision processor 60 a number of consecutive times at least equal to the SCV, then decision processor 60 will change output classification 64 to equal that most recent classification 52. Conversely, if the most recent classification 52 has been received at decision processor 60 a number of consecutive times less than the value of the SCV, then decision processor 60 will not change output classification 64.

As will be apparent from the above, in cases where the CL is high, a change to a new classification for output classification 64 will take longer than in circumstances wherein the CL is low. Further, by selecting appropriate values for the maximum CL value, the maximum required number of consecutive occurrences of a new classification 52 to occur before a change in the output classification 64 occurs can be set as desired.

Figure 2:
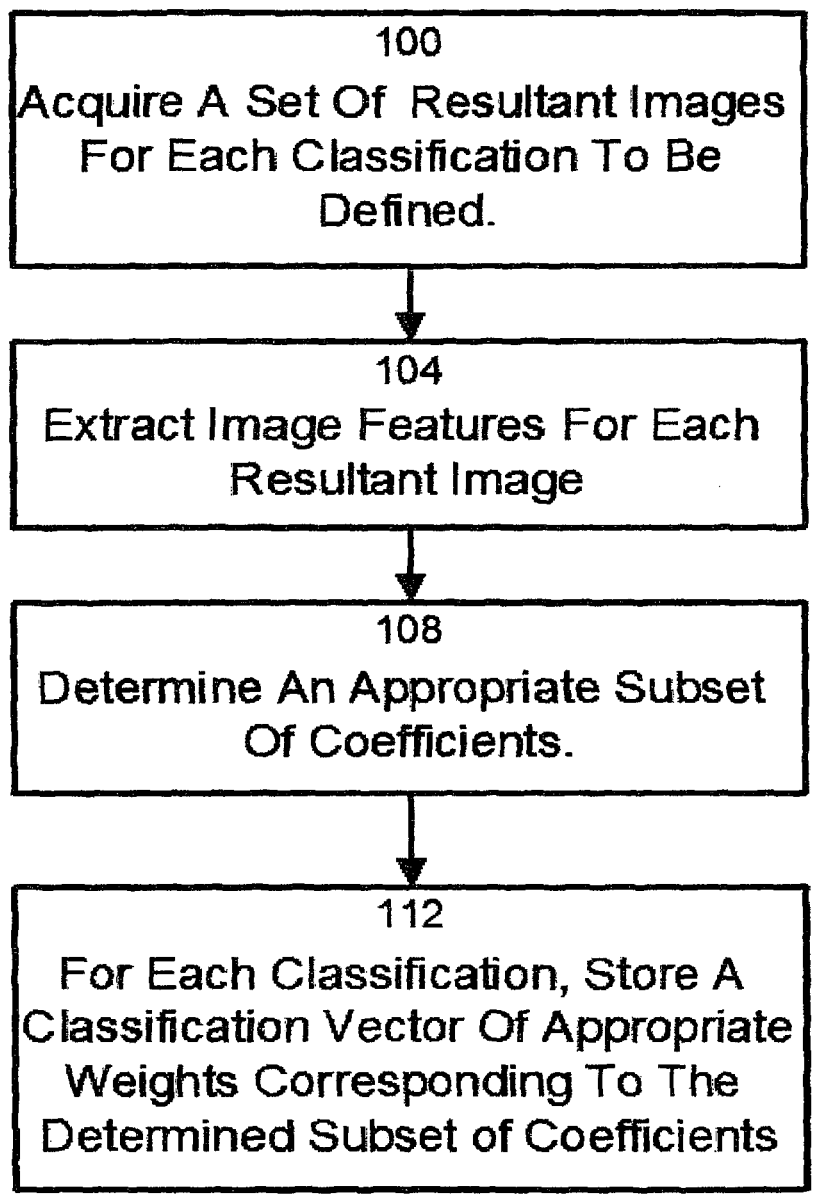
FIG. 2 is a flowchart showing a method of calibrating the system of FIG. 1.

It should be understood by those of skill in the art that decision processor 60 can also be responsive to additional inputs, such as occlusion detected signal 34, to alter output classification 64 as necessary. In the specific case of an occlusion being detected, perhaps for some minimum amount of time, decision processor 60 can change output classification 64 to a predefined default safe classification until the occlusion is removed. A method, in accordance with the present invention, is now described, with reference to the flow charts of FIGS. 2 and 3. The method of calibrating system 20 is shown in FIG. 2.

The method starts at step 100 where a plurality of resultant images is obtained for each classification to be defined for system 20. Each resultant image can be an image representing the entire field of view of the image capture device employed or can be a composite of one or more defined Regions of Interest (ROIs) within that field of view. Resultant images are obtained for a plurality of variations within each classification to be defined. For example, the position of an adult or ATD on a vehicle seat of interest can be changed and the seat base and/or seat back positions can be changed throughout a permitted range of movements while resultant images are obtained for these variations. A set of resultant images may comprise as many as one thousand or more resultant images for each classification.

The acquisition of the resultant images can be performed with high dynamic range processing, or with image subtraction processing, or with any other suitable method of acquiring appropriate images as will occur to those of skill in the art.

At step 104, information related to image features is extracted for each acquired resultant image. In the presently preferred embodiment of the invention, image feature extraction is achieved by processing each resultant image with a two dimensional Complex Discrete Wavelet Transform, preferably employing Daubechies filters, to produce a vector of coefficients representing features of the image for each resultant image. In the presently preferred embodiment, a three level decomposition is employed but it is also contemplated that fewer or additional levels of decomposition can be performed if desired.

At step 108, an appropriate set of the coefficients of the vectors is selected and a set of weights corresponding to the selected coefficients is determined. While the selected subset can include all of the coefficients, it is contemplated that, in most circumstances, it will be desired to select a subset of less than all of the available coefficients.

In a present embodiment of the invention, the selection of the appropriate subset is performed using an iterative wrapper method, with a "best-first" feature search engine, and a partial least squares regression model as the induction algorithm, although any other suitable selection method and method for determining weights, as will occur to those of skill in the art, can be employed.

At step 112, for each classification, the set of weights is stored as a calibration vector for the classification, the weights corresponding to the contribution of each coefficient in the selected subset to that classification. If the above-described iterative wrapper method and a partial least squares regression model is employed to determine the selected subset of coefficients, the weights will be the resulting corresponding regression weights for each defined classification. If another selection method is employed, the weights can be produced in any appropriate manner as will occur to those of skill in the art. The calibration vectors are stored for use by system 20.

Figure 3:
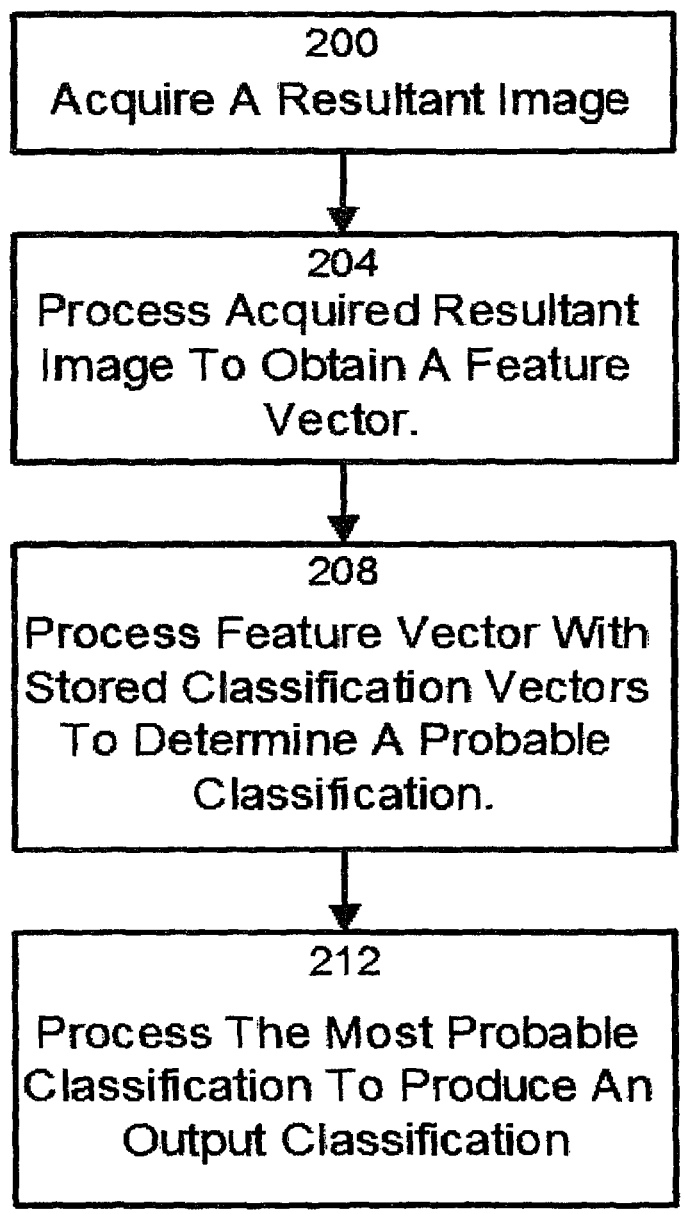
FIG. 3 is a flowchart showing a method of operating the system of FIG. 1.

The method of operating system 20 is shown in FIG. 3. The method starts at step 200 where an appropriate resultant image is obtained. The resultant image can be acquired by HOR processing, image subtraction or via any other suitable method of obtaining an appropriate image, as will occur to those of skill in the art, provided only that the image should be acquired in the same manner as were the resultant images used in the calibration of system 20.

The acquired images can comprise the entire field of view of the image capture device or can comprise one or more ROIs defined within that field of view, again provided only that the ROIs should be the same as the ROIs employed when acquiring the resultant images used in the calibration of system 20.

At step 204, image feature extraction is performed on the acquired resultant image to produce a feature vector representing information corresponding to features of interest in the resultant image which are produced in the same manner as in the calibration operation. In a present embodiment of the invention, the feature vector comprises the values for the subset of coefficients, selected during the calibration operation, determined with a two dimensional Complex Discrete Wavelet Transform, preferably employing Daubechies filters. Again, other techniques, as will occur to those of skill in the art, can be used to produce the feature vector provided only that the feature vector should be obtained in the same manner as were the calibration vectors used in the calibration of system 20.

At step 208, the feature vector obtained in step 204 is processed with the set of calibration vectors stored at step 116. In a present embodiment of the invention, copies of the feature vector are multiplied with each of the calibration vectors of corresponding weights to produce a set of scores, each score representing the probability that the acquired resultant image corresponds to a respective defined classification. The highest scoring classification is selected as the most probable classification.

At step 212, the most probable classification from step 208 is processed to determine the output classification 64 from system 20. In the present embodiment, the most probable classification is an input to a decision processor wherein the most probable classification is combined with: the present output classification, a confidence level updated and maintained by the decision processor; and a table of state transition values, the values representing the probability of a change from each state (classification) to each other state (classification). The result of the combination of these values is an output classification which is output by system 20.

The present invention provides a vehicle interior classification system and method which determines a classification relating to the interior of the vehicle, such as the occupancy status of a vehicle seat or the state of alertness of a vehicle driver, from one or more images of an appropriate portion of the interior of the vehicle acquired with an image capture device.

The acquired images are preferably processed to limit the dynamic range of the images to obtain a resultant image which can comprise one or more regions of interest which are less than the total field of view of the image capture device.

The resultant images are processed to extract information about features in the image and, in one embodiment, this processing is achieved with a two-dimensional complex discrete wavelet transform which produces a set of coefficients corresponding to the presence and/or location of the features in the resultant image.

The set of coefficients produced with such a transform is potentially quite large and can be reduced, through described techniques, to a subset of the total number of coefficients, the members of the subset being selected for their ability to discriminate between the classifications defined for the system.

By selecting a subset of the possible coefficients, computational requirements are reduced, as are hardware requirements in the system, such as memory.

The selected set of coefficients (whether comprising all of the coefficients or a subset thereof) are provided to a classifier which processes the coefficients with a set of calibration vectors, that were determined when the system was calibrated, to determine the most probable classification for the portion of the vehicle interior.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. A method for calibrating a vehicular vision system, said method comprising:
    providing a camera at a vehicle, said camera having a field of view;
    capturing images with said camera;
    acquiring a set of resultant images for a classification;
    extracting information related to image features in the set of resultant images;
    determining an appropriate subset of coefficients; and
    for each classification, storing a classification vector of at least one appropriate weight that corresponds to the determined subset of coefficients.

2. The method of claim 1, wherein said camera has a field of view interior of the vehicle.

3. The method of claim 1, wherein the set of resultant images comprises images of a region of interest within the field of view of said camera and wherein the region of interest corresponds to the respective classification for that set of resultant images.

4. The method of claim 1, comprising providing occlusion detection to detect an unacceptable occlusion at least partially occluding the field of view of said camera.

5. The method of claim 1, wherein the acquired resultant images comprise images of at least two regions of interest within the field of view of said camera.

6. The method of claim 5, wherein extracting image features in the set of resultant images is performed on the at least two regions of interest.

7. The method of claim 6, wherein images of the set of resultant images are acquired by obtaining a first image illuminated by ambient light and a second image illuminated by ambient light and a second frequency range of light and subtracting the first image from the second image to obtain the resultant images.

8. The method of claim 1, wherein the determined subset of coefficients is determined by processing sets of coefficients produced from a selection of calibration images and determining a subset of coefficients which acceptably discriminate between defined classifications.

9. The method of claim 1, wherein acquiring a set of resultant images comprises limiting the dynamic range of acquired images to obtain resultant images that comprise at least one region of interest, which encompasses a region of the field of view that is less than the field of view of said camera.

10. A method for calibrating a vehicular vision system, said method comprising:
    providing a camera at a vehicle, said camera having a field of view;
    capturing images with said camera;
    acquiring a set of resultant images for a classification;
    wherein the acquired resultant images comprise images of at least two regions of interest within the field of view of said camera;
    extracting information related to image features in the set of resultant images;
    determining an appropriate subset of coefficients;

for each classification, storing a classification vector of at least one appropriate weight that corresponds to the determined subset of coefficients; and providing occlusion detection to detect an unacceptable occlusion at least partially occluding the field of view of said camera.

11. The method of claim 10, wherein said camera has a field of view interior of the vehicle.

12. The method of claim 10, wherein extracting image features in the set of resultant images is performed on the at least two regions of interest.

13. The method of claim 12, wherein images of the set of resultant images are acquired by obtaining a first image illuminated by ambient light and a second image illuminated by ambient light and a second frequency range of light and subtracting the first image from the second image to obtain the resultant images.

14. The method of claim 10, wherein the determined subset of coefficients is determined by processing sets of coefficients produced from a selection of calibration images and determining a subset of coefficients which acceptably discriminate between defined classifications.

15. The method of claim 10, wherein acquiring a set of resultant images comprises limiting the dynamic range of acquired images to obtain resultant images that comprise at least one region of interest, which encompasses a region of the field of view that is less than the field of view of said camera.

16. A method for calibrating a vehicular vision system, said method comprising:

providing a camera at a vehicle, said camera having a field of view;

capturing images with said camera;

acquiring a set of resultant images for a classification;

wherein the set of resultant images comprises images of a region of interest within the field of view of said camera and wherein the region of interest corresponds to the respective classification for that set of resultant images;

extracting information related to image features in the set of resultant images;

determining an appropriate subset of coefficients;

for each classification, storing a classification vector of at least one appropriate weight that corresponds to the determined subset of coefficients; and providing occlusion detection to detect an unacceptable occlusion at least partially occluding the field of view of said camera.

17. The method of claim 16, wherein said camera has a field of view interior of the vehicle.

18. The method of claim 16, wherein images of the set of resultant images are acquired by obtaining a first image illuminated by ambient light and a second image illuminated by ambient light and a second frequency range of light and subtracting the first image from the second image to obtain the resultant images.

19. The method of claim 16, wherein the determined subset of coefficients is determined by processing sets of coefficients produced from a selection of calibration images and determining a subset of coefficients which acceptably discriminate between defined classifications.

20. The method of claim 16, wherein acquiring a set of resultant images comprises limiting the dynamic range of acquired images to obtain resultant images that comprise at least one region of interest, which encompasses a region of the field of view that is less than the field of view of said camera.

* * * * *